Dec. 10, 1963     F. D. IMEL     3,113,817
FISHING TACKLE CONTAINER
Filed May 1, 1962     2 Sheets-Sheet 1
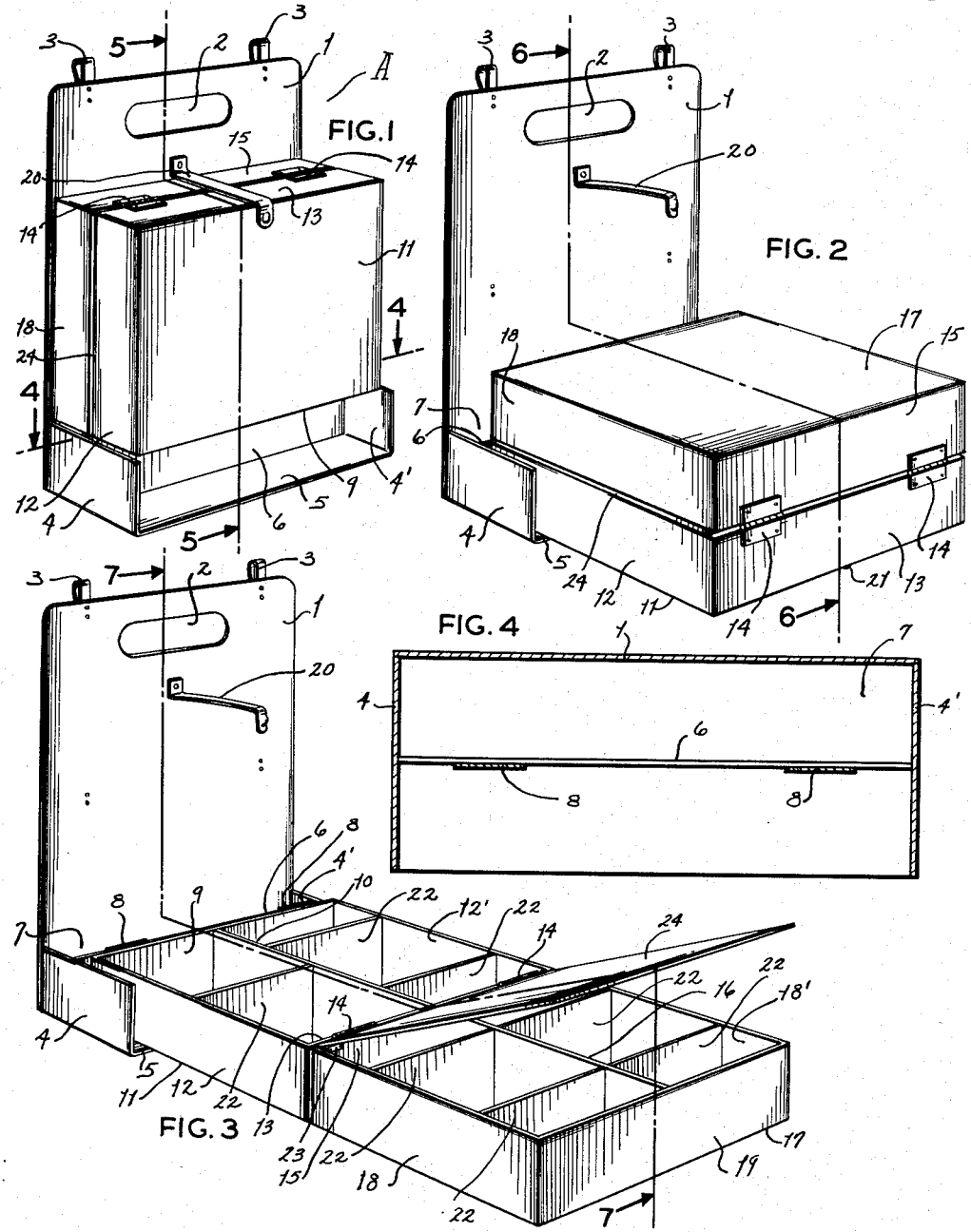
INVENTOR.
FLOYD D. IMEL
BY
ATTORNEY Dec. 10, 1963  F. D. IMEL  3,113,817
FISHING TACKLE CONTAINER
Filed May 1, 1962  2 Sheets-Sheet 2
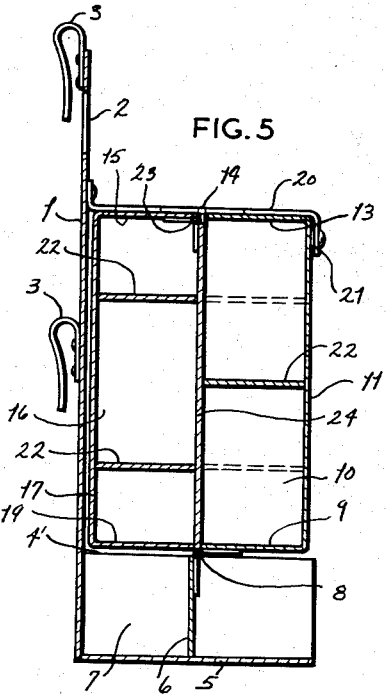
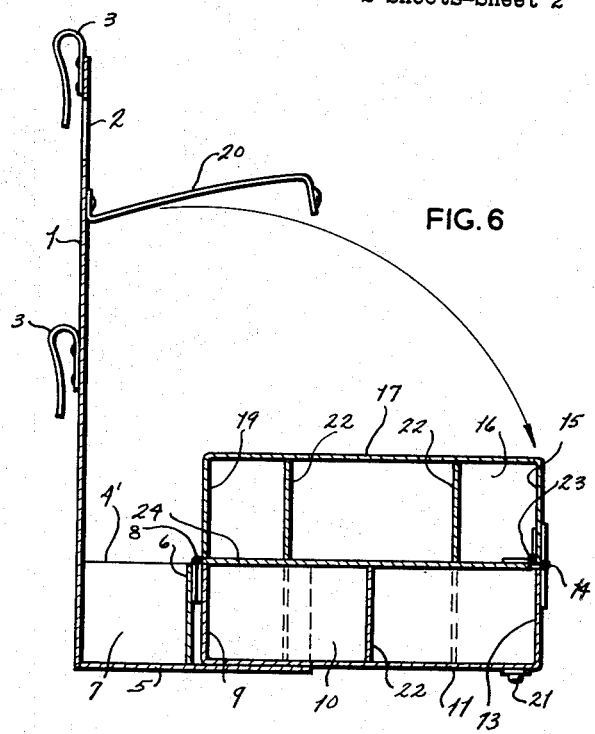
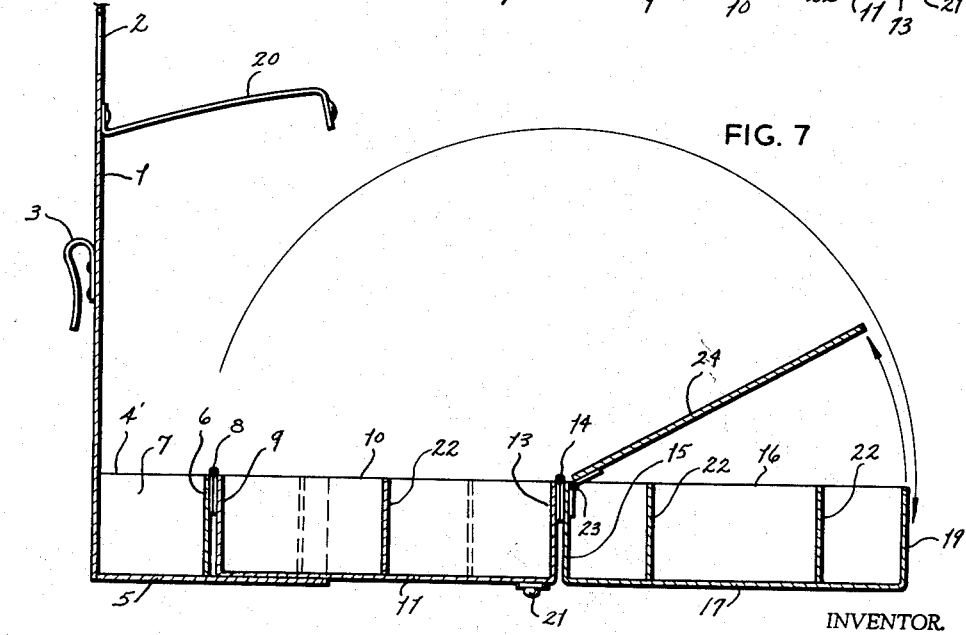
INVENTOR.
FLOYD D. IMEL
BY
ATTORNEY United States Patent Office 3,113,817
Patented Dec. 10, 1963

3,113,817
FISHING TACKLE CONTAINER
Floyd D. Imel, 343 N. Plum St., Carlinville, Ill.
Filed May 1, 1962, Ser. No. 191,510
4 Claims. (Cl. 312—199)

This invention relates in general to article-carrying cases and, more particularly, to new and useful improvements in a compact, compartmented, readily extensible container especially suitable for fishing tackle.

It is an object of the present invention to provide a container having a multiplicity of joined compartments and adapted for foldability so that when the container is in closed condition the same comprises a compact, readily portable unit, and when in open condition allows for ready access to all portions thereof.

It is another object of the present invention to provide a container of the character stated which is designed for support by any convenient expedient from the user, such as from a belt, shoulder strap, or the like; and which is so constructed and integrated as to prevent obstruction or hampering of the wearer-user's activities, such as during fishing, when the container is so carried and yet which allows of facile, momentary usage.

It is a further object of the present invention to provide a container incorporating a unique tool-receiving compartment to which access may be made without disturbing other portions of the container.

It is a still further object of the present invention to provide a fishing tackle container having means for easy hand-carriage; which is so constructed as to prevent inadvertent and untimely opening with consequent inconvenience to the user; which may be most economically fabricated; which comprises a simplicity of parts so as to be highly durable; which is amenable to production from a variety of materials, especially those of light weight; and which is completely reliable during use.

Other objects and details of the invention will be apparent from the following description, when read in connection with the accompanying drawings (2 sheets) wherein—

FIGURE 1 is a perspective view of a fishing tackle container constructed in accordance with, and embodying, the present invention.

FIGURE 2 is a perspective view showing the container in partially opened condition so as to permit access to the tool-receiving compartment.

FIGURE 3 is a perspective view showing the container in full-open condition.

FIGURE 4 is a horizontal transverse section taken on the line 4—4 of FIGURE 1.

FIGURE 5 is a vertical transverse section taken on the line 5—5 of FIGURE 1.

FIGURE 6 is a vertical transverse section taken on the line 6—6 of FIGURE 2.

FIGURE 7 is a vertical transverse section taken on the line 7—7 of FIGURE 3.

Referring now by reference characters to the drawings which illustrate the preferred embodiment of the present invention, A designates a fishing tackle container fabricated in a suitable relatively rigid but preferably light-weight material, such as aluminum, plastic, or the like, and comprising a flat, normally vertically presented mounting panel 1 which may be of rectangular contour and having in its upper central portion a transversely extending hand-carrying opening 2; there being suitably fixed on the rearward face of said panel 1 a plurality of spaced spring clips as at 3, for selected gripping of any convenient support members such as the belt of the user or, if desired, a stationary object.

Extending forwardly or outwardly from the outer face of panel 1 at its opposite sides and in its lower portion are parallel side plates 4, 4' which are of relatively reduced height and which are inter-connected at their lower ends by a base plate 5 extending therebetween and projecting forwardly from the bottom edge of support panel 1; the outer end edges of said plates 4, 4' and base plate 5 being free. Extending between the inner faces of side plates 4, 4', in planar parallel relationship to support panel 1 and being substantially equally spaced from said support panel 1 and the outer edge of base plate 5 is a partition 6 of like height as said side plates 4, 4'. Thus, side plates 4, 4', partition 6, base plate 5 and the portion of panel 1 parallel to partition 6 cooperate to define an upwardly opening compartment indicated at 7 which is designed for receiving tools and other implements of the type customarily utilized by fishermen for effecting adjustments and the like of the marked variety of demountable elements used with fishing rods.

Engaged to the upper outer portion of partition 6 as by a hinge 8 which, if desired, may be of the so-called piano type, is the normally inner end wall 9 of a rectangular compartment 10, having a bottom wall 11, a pair of parallel side walls 12, 12', and an outer end wall 13. The width of compartment 10 is less than the distance between side plates 4, 4' so that when said compartment 10 is in downwardly and outwardly swung, or in open, condition (FIGURE 3), bottom wall 11 will be supported upon base plate 5 outwardly of partition 6 so as to both stabilize compartment 10 in such position as well as to effect presentation thereof in a substantially horizontal manner to permit easy and convenient access to the interior thereof by the user. Thus, by virtue of hinged connection 8, compartment 10 is adapted for swinging through substantially a ninety degree arc, between lowered or open, horizontal position and upward vertical, or closed condition (FIGURE 5).

Swingably engaged, as by a hinge 14 to the upper outer face of normally outer end wall 13 of compartment 10 is the inner end wall 15 of a companion compartment 16 having a bottom wall 17, parallel side walls 18, 18', and an outer end wall 19. Compartment 16 is of the same dimensions as compartment 10.

By operation of hinge 14 companion compartment 16 is adapted for swinging through an arc of substantially 180°, between open condition wherein the same is in planar aligned, side-by-side relation with compartment 10 (as may best be seen in FIGURES 3 and 7), said compartments 10, 16 in such state conjointly serving to present an enlarged upwardly opening receptacle; and closed condition wherein said compartment 16 is in superimposed, closing relationship upon compartment 10. (See FIGURES 2 and 6.) With compartments 10 and 16 in mutually closed relationship, the same may then be unitarily swung through a further arc of ninety degrees, into upright position, wherein the respective bottom walls 11, 17 are substantially planar parallel to panel 1 with outer end wall 19 of compartment 16 being in immediate overlying closing relationship to compartment 7. It will thus be particularly noted that the distance between partition 6 and support panel 1 is designed for correlation to the height of said compartment end wall 19.

With compartments 10 and 16 in mutually closed, upwardly swung position, case A is in securely closed relationship with compartment 7 as being covered to prevent any inadvertent displacement of tools or the like therefrom. A spring-clip member 20 which is engaged to the outer face of panel 1 is adapted to extend across the aligned, now upwardly presented end walls 13, 19 of compartments 10, 16 and abut the now vertical bottom wall 11 of compartment 10 so as to maintain the latter against accidental, premature outwardly swinging movement. Said clip 20 may, if desired, be of strap character and adapted to engage a fastener 21 provided on compartment 10.

Interiorly compartments 10 and 16 may be divided into sections of pre-selected extent for the orderly maintenance, in a segregated manner, of the innumerable articles utilized by fishermen such as lures, flys, hooks, etc.; such sectioning being effected by dividing elements indicated generally at 22.

Engaged to the normally inner face of end wall 14 of compartment 16, along its upper longitudinal margin, as by a hinge member 23, is a closure plate 24 being coextensive with the area of compartment 16 so that the same may, when in closed position, completely cover the normally upper end thereof, but being readily upwardly swingable to allow access to the interior of said compartment 16. It is, of course, apparent that, if desired, fastening means may be provided for maintaining closure plate 24 in closed relation. However, it will be recognized that closure plate 24 serves to prevent the inadvertent interpassage of articles of equipment between compartments 10 and 16 when the same are in confronting relationship.

As is evident from the foregoing, access is accorded the user to tool kit compartment 7 without necessitating opening of either the article-receiving compartments 10, 16. This is a decided advance over present containers of this character wherein the user must customarily open the entire container in order to approach but a single section thereof.

Case A thus constitutes a most unique container for articles and, as pointed out above, is especially suitable for fishing tackle since the same may be produced of light weight and thus be transported by the user with minimum effort; and the same is uniquely designed for folding into a most compact unit while being adapted for opening or unfolding action to provide access to a multiplicity of compartments, each of which may contain selected articles for the particular operation of the user. Said case A is easily opened so as to permit access to any one of its numerous compartments and is secure when in closed relation so as to avoid any inadvertent opening with consequent loss of contents.

It should be understood that changes and modifications in the formation, construction, arrangement, and combination of the several parts of the fishing tackle container may be made and substituted for these herein shown and described without departing from the nature and principle of the invention.

Having thus described my invention, what I claim and desire to secure by Letters Patent is:

1. An article-carrying case comprising a pair of parallel side walls, a bottom wall, and parallel first and second end walls for conjunctively defining an upwardly opening compartment, said first end wall being of greater height than said second end wall, said bottom wall extending beyond said second end wall, first and second containers, each having parallel inner and outer end walls, parallel side walls, and a base wall, first hinge means engaging the said inner end wall of said first container to said second end wall, second hinge means engaging the inner end wall of said second container to the outer end wall of said first container, said second container being swingable between planar-wise, aligned end-to-end relation to said first container and superimposed relation upon said first container, said first and second containers in superimposed relation being swingable about said first hinge means into vertical position upon said second end wall in planar parallel relation to said first end wall.

2. An article-carrying case as defined in claim 1 and further characterized by the height of the side walls of said second container being substantially equal to the distance between said first and second end walls for closing the upper end of said compartment when said containers are in upwardly swung, vertical position.

3. An article-carrying case as defined in claim 2 and further characterized by said first and second containers being of approximately the same dimensions.

4. An article-carrying case as defined in claim 1 wherein the base wall of said first container is supported on the extended portion of said bottom wall when said first and second containers are in end-to-end relation.

References Cited in the file of this patent
UNITED STATES PATENTS

| | | |
|---|---|---|
| 244,832 | Stohlmann | July 26, 1881 |
| 589,344 | Eccleston | Aug. 31, 1897 |
| 2,409,308 | Paxton | Oct. 15, 1946 |
| 3,065,308 | Suyeoka | Nov. 20, 1962 |

FOREIGN PATENTS

| | | |
|---|---|---|
| 161,252 | Germany | July 8, 1905 |
| 239,187 | Switzerland | Sept. 30, 1945 |